(12) United States Patent
Li et al.

(10) Patent No.: US 10,694,754 B2
(45) Date of Patent: Jun. 30, 2020

(54) ONE TYPE OF PASTA ROLLER WITH A BUILT-IN MOTOR FOR MANUAL AND ELECTRIC PASTA ROLLER MACHINE

(71) Applicant: SHANGHAI TERIN CO., LTD., Shanghai (CN)

(72) Inventors: Liang Li, Shanghai (CN); Rui-Ling Zhang, Shanghai (CN)

(73) Assignee: Shanghai Terin Co., LTD., Shanghai (CN)

( * ) Notice: Subject to any disclaimer, the term of this patent is extended or adjusted under 35 U.S.C. 154(b) by 79 days.

(21) Appl. No.: 16/188,746

(22) Filed: Nov. 13, 2018

(65) Prior Publication Data

US 2019/0183133 A1 Jun. 20, 2019

(30) Foreign Application Priority Data

Dec. 20, 2017 (CN) .......................... 2017 1 1380689

(51) Int. Cl.
*A21C 3/02* (2006.01)

(52) U.S. Cl.
CPC ..................... *A21C 3/02* (2013.01)

(58) Field of Classification Search
CPC ............ A21C 3/02; A21C 3/021; A21C 3/024
USPC ................................. 425/366, 367
See application file for complete search history.

(56) References Cited

U.S. PATENT DOCUMENTS

| 1,552,559 | A | * | 9/1925 | Hammond | ................ | B29B 7/68 |
| | | | | | | 425/194 |
| 1,650,758 | A | * | 11/1927 | Kukla | .................... | A21C 3/021 |
| | | | | | | 425/230 |
| 2,204,825 | A | * | 6/1940 | Rossi | ....................... | A21C 3/02 |
| | | | | | | 425/310 |
| 2,566,628 | A | * | 9/1951 | Patt | ........................ | A21C 11/22 |
| | | | | | | 425/168 |
| 3,292,208 | A | * | 12/1966 | Wood | ..................... | B21B 37/28 |
| | | | | | | 425/141 |
| 4,070,742 | A | * | 1/1978 | Dorfman | ................ | A21C 3/021 |
| | | | | | | 492/10 |
| 5,626,898 | A | * | 5/1997 | Caridis | .................... | A21C 3/02 |
| | | | | | | 426/502 |
| 7,501,139 | B2 | * | 3/2009 | Morikawa | .............. | A21C 3/025 |
| | | | | | | 100/168 |
| 7,648,356 | B2 | * | 1/2010 | Fiedler | ................... | A21C 3/027 |
| | | | | | | 425/194 |
| 2008/0241305 | A1 | * | 10/2008 | Fiedler | .................. | A21C 3/027 |
| | | | | | | 425/367 |

(Continued)

*Primary Examiner* — Jason L Vaughan
(74) *Attorney, Agent, or Firm* — Zhihua Han; Wen IP LLC

(57) ABSTRACT

A pasta roller with a built-in motor for manual and electric pasta roller machine includes a first shaft and a direct current motor received in a main roller. The first shaft is fixed to the main roller. The direct current motor drives the first shaft in one direction via a planetary reduction gear unit. A second shaft is co-axially located in the main roller and has a first end gear mounted thereto. A secondary roller is located beside the main roller and has a second end gear connected to one end thereof. The first and second end gears are engaged with each other. A crank is removably inserted into a hole in the first shaft. When in manual operation, the crank is rotated to rotate the main roller and the second shaft, and the secondary roller is rotated by the engagement between the first and second end gears.

6 Claims, 2 Drawing Sheets

(56) References Cited

U.S. PATENT DOCUMENTS

2009/0090253 A1\* 4/2009 Wells .................. A21C 3/02
                                                                    99/491
2015/0110938 A1\* 4/2015 Ruhe ................... A21C 3/00
                                                                   426/517

\* cited by examiner

ONE TYPE OF PASTA ROLLER WITH A BUILT-IN MOTOR FOR MANUAL AND ELECTRIC PASTA ROLLER MACHINE

BACKGROUND OF THE INVENTION

1. Fields of the Invention

The present invention relates to a "PASTA ROLLER WITH A BUILT-IN MOTOR" for a pasta roller machine, and more particularly, to a manual and electric pasta roller machine with a DC gear motor located inside the main roller to drive the main roller and the secondary roller, the pasta roller machine can be operated manually when needed.

2. Descriptions of Related Art

The conventional pasta roller machine is powered by a motor which is installed outside of the machine, and the motor usually is an AC motor. The AC motor occupies a lot of space and heavy, and is not convenient for clearing and movement.

All manually operated pasta roller machine required the users rotating a crank to roll the rollers, although this type of pasta roller machine is compact and easy to use. The users have to operate the crank by one hand and hold the dough by another, this requires a certain level of skill and effort.

The present invention is intended to provide a new type of pasta roller with a built-in motor for both manual and electric pasta roller machine that is designed to eliminate the drawbacks mentioned above.

SUMMARY OF THE INVENTION

The present invention relates to a manual and electric pasta roller machine and comprises a main roller in which a direct current gear motor and a first shall are received therein. The first shaft is fixed to the main roller. The direct current motor drives the first shaft in one direction via a planetary reduction gear unit. A second shaft is co-axially located in the main roller and has a first end gear mounted thereto. A bearing is located between a seat and the second shaft. A secondary roller is located beside the main roller and has a second end gear connected to one end thereof. The first and second end gears are engaged with each other. A crank is removably inserted into a hole in the first shaft. The second shall rotates the secondary roller via an engagement between the first and second end gears. The direct current motor is electrically connected with an exterior power source and a switch.

Preferably, the crank includes keys which are engaged with slots in the hole of the first shaft.

Preferably, a one-way bearing is located between the planetary reduction gear unit and the first shaft.

Preferably, the gap between the main roller and the secondary roller is adjustable.

Preferably, the main roller and the secondary roller are able to treat a dough into a sheet strips or to create patterns on the sheet.

Preferably, the direct current motor is a direct current gear motor.

The advantages of the present invention are that the direct current gear motor is located in the main roller and is activated to rotate the main roller. The secondary roller is driven by the first and second end gears. When operating the pasta rolling machine manually, the electric power is not supplied to the direct current gear motor, the user rotates the crank. The direct current gear motor is separated from the planetary reduction gear unit, so that the main roller is rotated and drives the secondary roller. The dough is rolled to be a sheet of desired thickness.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
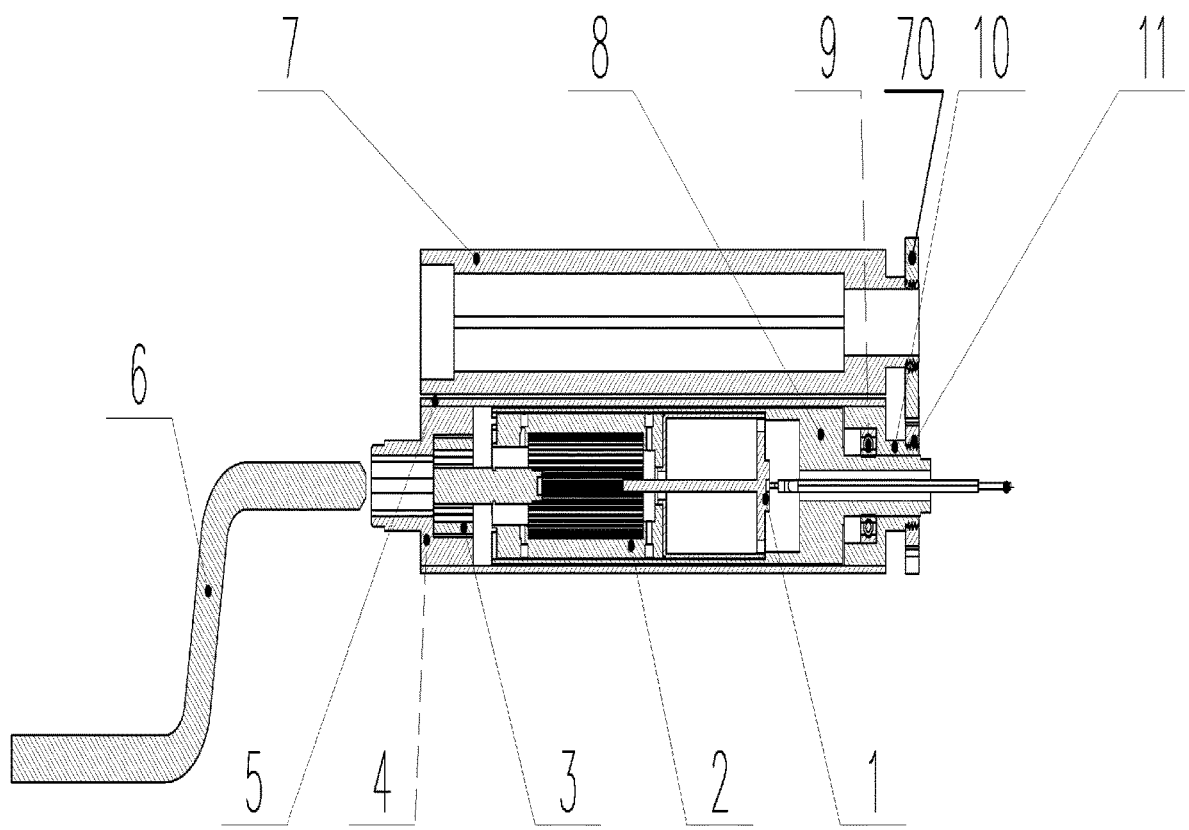
FIG. 1 is a cross sectional view of the pasta roller with a built-in motor of the present invention.
Figure 2:
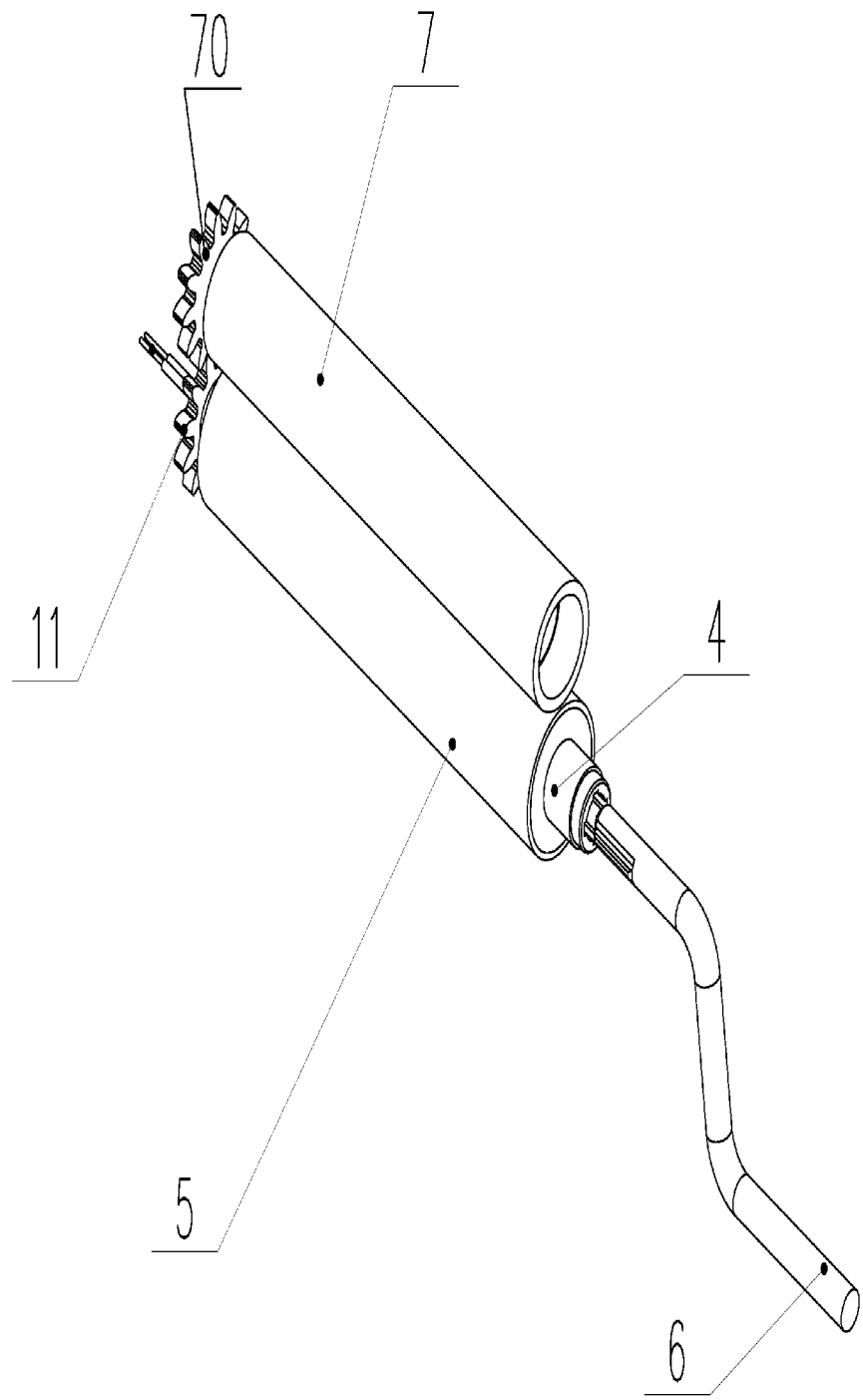
FIG. 2 shows a perspective view of the pasta roller with a built-in motor for main roller, the secondary roller, the crank and the first and second end gears.

Referring to FIGS. 1 and 2, the built-in electric pasta roller for the manual and electric pasta roller machine of the present invention comprises a direct current gear motor 1, a main roller 5 and a secondary roller 7. The direct current gear motor l and a first shaft 4 are received in the main roller 5, wherein the direct current motor 1 is connected to a seat 8 in the main roller 5. The first shaft 4 is fixed to the first end of the main roller 5. The direct current motor 1 drives the first shaft 4 in one direction via a planetary reduction gear unit 2. In the preferable embodiment, a one-way bearing 3 is located between the planetary reduction gear unit 2 and the first shaft 4, so that the planetary reduction gear unit 2 drives the first shaft 4 in one direction. The direct current motor 1 is a direct current gear motor.

A second shaft 10 is co-axially located in the second end of the main roller 5 and has a first end gear 11 mounted thereto. A bearing 9 is located between the seat 8 and the second shaft 10. A secondary roller 7 is located beside the main roller 5 and has a second end gear 70 connected to one end thereof. The first and second end gears 11, 70 are engaged with each other so that the main roller 5 and the secondary roller 7 are rotated in opposite directions. A crank 6 is removably inserted into a hole in the first shaft 4. Specifically, the crank 6 includes keys which are engaged with slots in the hole of the first shaft 4. The direct current motor 1 is electrically connected with an exterior power source and a switch (both not shown).

When the direct current motor 1 is activated, the planetary reduction gear unit 2 drives the first shaft 4 in one direction, and the first shaft 4 drives the main roller 5. The second shaft 10 rotates and drives the secondary roller 7 via the engagement between the first and second end gears 11, 70 so that the dough is rolled between the main roller 5 and the secondary roller 7.

When manually operating the manual and electric pasta roller machine of the present invention, the power for the direct current motor 1 is cut off, the crank 6 is inserted into the hole of the first shaft 4, by the engagement between the keys of the crank 6 and slots in the hole of the first shaft 4, the first shaft 4 is rotated in one direction by rotating the crank 6, so that the main and secondary roller 5, 7 are rotated as well to roll the dough between the main and secondary roller 5, 7. It is noted that the gap between the main roller 5 and the secondary roller 7 is adjustable, and the main roller 5 and the secondary roller 7 are able to treat a dough into a sheet, strips or to create patterns on the sheet.

While we have shown and described the embodiment in accordance with the present invention, it should be clear to those skilled in the art that further embodiments may be made without departing from the scope of the present invention.

What is claimed is:

1. A pasta roller with a built-in motor for a manual and electric pasta roller machine comprising:

a main roller, a direct current gear motor and a first shaft received in the main roller, the direct current motor connected to a seat in the main roller, the first shaft being fixed to the main roller, the direct current motor driving the first shaft in one direction via a planetary reduction gear unit, a second shaft co-axially located in the main roller and having a first end gear mounted thereto, a bearing located between the seat and the second shaft, and a secondary roller located beside the main roller and having a second end gear connected to one end thereof, the first and second end gears engaged with each other, the second shaft rotating the secondary roller via an engagement between the first and second end gears, and a crank removably inserted into a hole in the first shaft, the direct current motor adapted to be electrically connected with an exterior power source and a switch.

2. The pasta roller with a built-in motor for a manual and electric pasta roller machine as claimed in claim 1, wherein the crank includes keys which are engaged with slots in the hole of the first shaft.

3. The pasta roller with a built-in motor for a manual and electric pasta roller machine as claimed in claim 1, wherein a one-way bearing is located between the planetary reduction gear unit and the first shaft.

4. The pasta roller with a built-in motor for a manual and electric pasta roller machine as claimed in claim 1, wherein a gap between the main roller and the secondary roller is adjustable.

5. The pasta roller with a built-in motor for a manual and electric pasta roller machine as claimed in claim 1, wherein the main roller and the secondary roller are adapted to treat a dough into a sheet, strips or to create patterns on the sheet.

6. The pasta roller with a built-in motor for a manual and electric pasta roller machine as claimed in claim 1, wherein the direct current motor is a direct current gear motor.

* * * * *